UNITED STATES PATENT OFFICE.

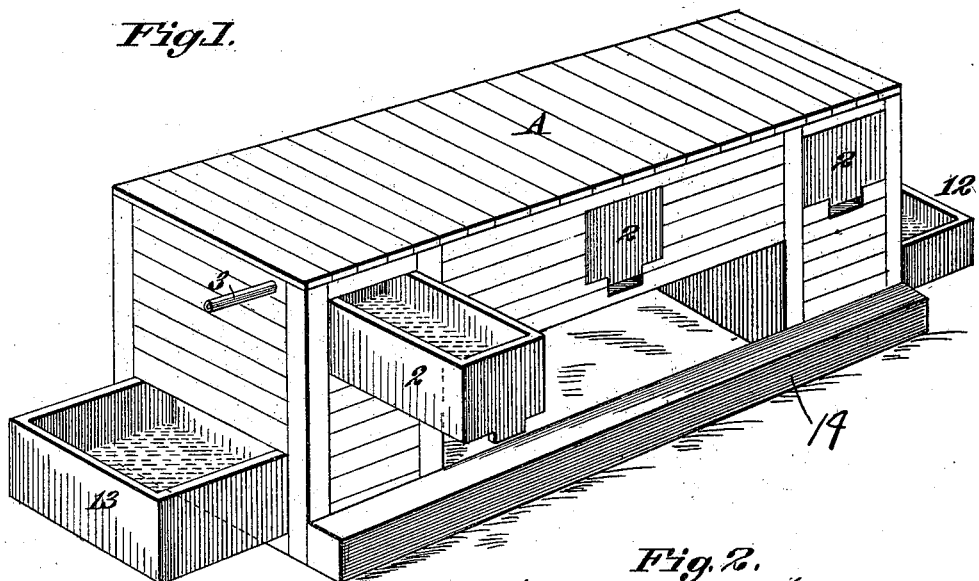
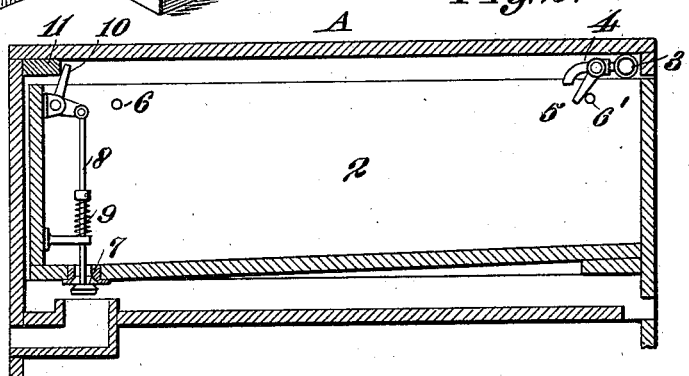
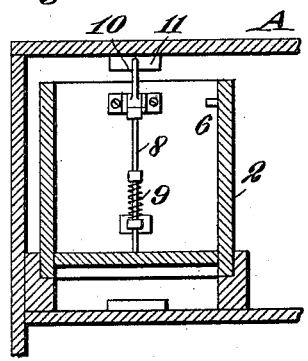

MENDOCINO MANSFIELD, OF KING CITY, CALIFORNIA.

WATERING-TROUGH.

1,000,531.  Specification of Letters Patent.  Patented Aug. 15, 1911.

Application filed November 1, 1910. Serial No. 590,145.

*To all whom it may concern:*

Be it known that I, MENDOCINO MANSFIELD, citizen of the United States, residing at King City, in the county of Monterey and State of California, have invented new and useful Improvements in Watering-Troughs, of which the following is a specification.

My invention relates to improvements in troughs for watering cattle and other animals.

It consists in a closed casing with means for supplying water thereto, and series of troughs which may be normally closed and protected within the casing; and means connected with said troughs by which a supply valve or cock is opened when the troughs are drawn out, and by which a discharge valve is opened when the troughs are closed.

The invention consists of the combination of parts and details of construction which will be more fully described and claimed by reference to the accompanying drawings, in which—

Figure 1 is a perspective view of my apparatus. Fig. 2 is a transverse vertical section taken through one of the troughs. Fig. 3 is a transverse section of one of the troughs and the inclosing portion.

When watering troughs are open and exposed, the water becomes contaminated in various ways and hunters will frequently put their dogs into the troughs to wash or bathe them and when this has been done, and from other contaminations, horses in particular will not drink from the trough.

It is the object of my invention to protect the various parts of watering troughs and to expose the tank portions only when they are to be used.

I have here shown my invention embodied as follows:

A is a casing of sufficient size to contain as many troughs as it may be desired to employ. The troughs 2 are here shown as slidable on suitable guides, transversely to the casing A, and closable so as to be protected by the top of the casing. A suitable water supply may be introduced conveniently in the upper part of the casing through a pipe 3. Connected with this pipe are faucets as at 4, having lever arms or handles 5 projecting downwardly in line with one of the inner sides of the trough. A pin or lug 6 projects from the side of the trough in such position that when the trough is withdrawn the pin will strike the handle 5 and will thus turn it and open the faucet, allowing water to flow into the trough as long as the latter remains open. When an animal has finished drinking, the trough may be closed and when pushed back a pin 6', similar to that shown at 6, is employed which acts to close the faucet.

At some portion in the bottom of the trough is fitted a valve 7, having a stem 8 and by means of a spring 9 this valve is closed when the trough is opened. When the trough is moved back to its closed position, a lever arm 10 which acts to compress the spring 9 is acted upon by a counter-piece 11 fixed in the rear portion of the trough. This opens the valve 7 and allows the contents of the trough to escape, so that the trough will always be maintained clean, and only fresh water will be used when desired.

For the convenience of dogs or smaller animals, other troughs as at 12 may be fixed in the lower part of the casing A and these may if desired remain open the principal part of the time.

At 13 I have shown a larger trough which will serve for the purpose of washing dogs or for other purposes, which would unfit the water for drinking.

It will be seen that the water may remain in any of the troughs by simply pulling the trough out to a point where it will fill and then pushing it back sufficiently to close the supply cock or valve without opening the discharge valve. It will be understood that a hose or other connection may also be employed in conjunction with the supply pipe for the use of automobiles, or for filling other receptacles which are at a distance from the trough.

The apparatus may be made of any desired length so that in case of teams having four or more horses being brought up as many of the troughs may be opened as desired, so that all the animals may be watered at one time. A protecting base 14 may be extended along the front of the trough to prevent the hubs of the wheels from striking the structure in case the wagon is driven too near.

Having thus described my invention, what I claim and desire to secure by Letters Patent is—

1. A watering trough comprising an inclosing casing, with a valve-controlled supply pipe, a trough slidable within the casing, and means carried by the trough adapted to actuate the valve in unison with the exposure of said trough to open connection from the water pipe to the trough.

2. A watering trough consisting of an inclosing casing with water supply pipes, troughs slidable within the casing, means to open connection from the pipes to the trough in unison with the exposure of the trough, and to close the supply when the trough is returned.

3. A watering trough consisting of an inclosing casing with water supply pipes, troughs slidable within the casing, means to open connection from the pipes to the trough in unison with the exposure of the trough and to close the supply when the trough is returned, and means to discharge the contents of the trough when closed.

4. A watering trough consisting of an inclosing casing with water supply pipes, troughs slidable within the casing, and means to open connection from the pipes to the trough, said means including a faucet with a handle, and a contact pin fixed to and movable with the trough.

5. A watering trough consisting of an inclosing casing with water supply pipes, troughs slidable within the casing, means to open connection from the pipes to the trough, and means to discharge the trough when closed, said means including a discharge valve, a spring pressed lever by which it is closed, and a fixed strap with which the lever contacts when the trough is closed.

6. The combination in a watering trough of an inclosure with valve-controlled water supply pipes, troughs capable of being exposed or concealed with relation to the inclosure, and means carried by the troughs and actuating the valves in unison with the exposure of said troughs to automatically open the supply when the troughs are exposed and to close the supply and drain the troughs when closed.

In testimony whereof I have hereunto set my hand in the presence of two subscribing witnesses.

MENDOCINO MANSFIELD.

Witnesses:
   JAS. H. MYERS,
   LAURA MADERO.

---

Copies of this patent may be obtained for five cents each, by addressing the "Commissioner of Patents, Washington, D. C."